US012787047B2

(12) United States Patent
Sibel et al.

(10) Patent No.: US 12,787,047 B2
(45) Date of Patent: Nov. 3, 2026

(54) METHOD AND PROCESSING DEVICE IN SYSTEM COMPRISING RESOURCE SCHEDULER AND SET OF DEVICE

(71) Applicant: MITSUBISHI ELECTRIC CORPORATION, Tokyo (JP)

(72) Inventors: Jean-Christophe Sibel, Rennes Cedex (FR); Nicolas Gresset, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 328 days.

(21) Appl. No.: 18/727,945

(22) PCT Filed: Jul. 11, 2022

(86) PCT No.: PCT/JP2022/027784
§ 371 (c)(1),
(2) Date: Jul. 10, 2024

(87) PCT Pub. No.: WO2023/162289
PCT Pub. Date: Aug. 31, 2023

(65) Prior Publication Data

US 2026/0262070 A1 Sep. 3, 2026

(30) Foreign Application Priority Data

Feb. 24, 2022 (EP) .................................... 22305209

(51) Int. Cl.
*H04W 72/53* (2023.01)
*H04W 72/04* (2023.01)
*H04W 72/543* (2023.01)

(52) U.S. Cl.
CPC .......... *H04W 72/53* (2023.01); *H04W 72/04* (2013.01); *H04W 72/543* (2023.01)

(58) Field of Classification Search
CPC .... H04W 72/04; H04W 72/53; H04W 72/543
See application file for complete search history.

(56) References Cited

U.S. PATENT DOCUMENTS

2020/0120015 A1* 4/2020 Boucadair .......... H04L 12/2898

OTHER PUBLICATIONS

International Search Report for PCT/JP2022/027784 mailed on Nov. 15, 2022.

(Continued)

*Primary Examiner* — Brian P Cox
(74) *Attorney, Agent, or Firm* — Birch, Stewart, Kolasch & Birch, LLP

(57) ABSTRACT

A method in a system comprising a resource scheduler and a set of devices is disclosed. Each device hosts at least one application, each application transmitting a stream of messages to at least one receiver. The method comprises: —obtaining, for each stream, parameters comprising one message lifetime, one message period and a last buffering time of a message of said stream before a given time window starts; —deducing a set of configurations of said streams in said time window; —computing, for each configuration, one configuration-based resource usage ratio per each stream; —transmitting data to the resource scheduler, said data comprising each configuration with its computed set of configuration-based resource usage ratios.

13 Claims, 10 Drawing Sheets

(56) References Cited

OTHER PUBLICATIONS

Nasrallah et al., "Reconfiguration Algorithms for High Precision Communications in Time Sensitive Networks: Time-Aware Shaper Configuration with IEEE 802.1Qcc (Extended Version)", arxiv.org, Cornell University Library, 201 Olin Library Cornell University Ithaca, NY 14853, Jun. 27, 2019, pp. 1-29.
Nasrallah et al., "Ultra-Low Latency (ULL) Networks: The IEEE TSN and IETF DetNet Standards and Related 5G ULL Research", arxiv.org, Cornell University Library, 201 Olin Library Cornell University Ithaca, NY 14853, Mar. 20, 2018, pp. 1-59.
Written Opinion of the International Searching Authority for PCT/JP2022/027784 mailed on Nov. 15, 2022.

* cited by examiner

METHOD AND PROCESSING DEVICE IN SYSTEM COMPRISING RESOURCE SCHEDULER AND SET OF DEVICE

TECHNICAL FIELD

At least one of the present embodiments generally relates to a method for computing resource usage ratios and for transmitting them to a resource scheduler. At least one of the present embodiments also relates to a device configured to implement the method.

BACKGROUND ART

The Fourth Industrial Revolution (or Industry 4.0) refers to the automation of traditional manufacturing using smart technology such as Internet of Things, cloud computing.

Robotics is part of the Industry 4.0. Indeed, in smart factories, robots are used to limit human operations. In this framework, communications play a key role. The application's requirements in Industry 4.0 is centered on multiple factors such as reliability, latency, longevity of communication devices. Currently, robots are often connected to a wired infrastructure. Time Sensitive Networking (TSN) is the standard Ethernet-based technology for converged networks of Industry 4.0 due to its capacity to support deterministic latency requirements. More precisely, TSN standard extend the traditional Ethernet data-link layer standards to guarantee data transmission with bounded ultra-low latency, low delay variation (jitter), and extremely low loss, which is ideal for industrial control and automotive applications.

TSN defines Time Aware Shaper (TAS) schedulers for guaranteeing the transmission of high priority deterministic traffic in a bounded time. However, TAS suffers from high overhead for short lived flows and thus degrades communication performance.

In addition, contrary to wireless technologies, TSN based networks cannot provide the required flexibility to support mobile industrial applications required for the factories of the future. Wireless networks have many advantages, including flexibility, low cost, ease of deployment but at the cost of reliability.

In such wireless environments, existing schedulers usually implement resource allocation methods that predict future resource allocations from past resource allocations. Such resource allocation methods thus cannot adapt in case of sudden changes of application performance requirements. Such changes may happen when an application needs to adapt to new radio link conditions.

It is thus desirable to find a method for resource allocation in a wireless environment that adapt quickly and more accurately to sudden changes of application performance requirements.

SUMMARY OF INVENTION

At least one of the present embodiments generally relates to a method in a system comprising a resource scheduler and a set of devices, each device hosting at least one application, each application transmitting a stream of messages to at least one receiver. The method comprises:

- obtaining, for each stream, parameters comprising one message lifetime, one message period and a last buffering time of a message of said stream before a given time window starts;
- deducing, from the obtained parameters, a set of configurations of said streams in said time window, a configuration of said streams being defined as a specific configuration of active streams, a stream being active in a given time slot in the case where there is a packet corresponding to said message to be sent or received;
- computing, for each configuration, one configuration-based resource usage ratio per each stream such that the sum of the configuration-based resource usage ratios for said configuration is equal to one, said computing being under the constraint that, for each stream, there is at least one configuration for which the configuration-based resource usage ratio for said stream is not null;
- transmitting data to the resource scheduler, said data comprising each configuration with its computed set of configuration-based resource usage ratios.

By transmitting said data to the resource scheduler, the resource scheduler may be guided and thus resource allocation may adapt quickly and more accurately to sudden changes of application performance requirements.

In one embodiment, the obtained parameters further comprise a resilience value being a maximum amount of time an application authorizes for not receiving any packet and wherein the size of said time window is defined from said resilience values.

In one embodiment, the method further comprises:

- averaging, for each stream, the configuration-based resource usage ratios of said stream;

and wherein transmitting data to the resource scheduler comprises transmitting, for each stream, the averaged configuration-based resource usage ratio instead of transmitting each configuration with its computed set of configuration-based resource usage ratios.

In one embodiment, computing, for each configuration, one configuration-based resource usage ratio per each stream comprises:

- selecting a cost function;
- selecting a solving method; and
- optimizing the cost function using the selected solving method to compute, for each configuration, one configuration-based resource usage ratio per each stream such that the sum of the configuration-based resource usage ratios for said configuration is equal to one, said computing being under the constraint that, for each stream, there is at least one configuration for which the configuration-based resource usage ratio for said stream is not null.

In one embodiment, said cost function is selected in a set comprising the following cost functions:

$$J_k^{(W)} = \prod\nolimits_{C_j \in \mathcal{A}_k^{(W)}} P_{e_k}^{\rho_{k,j}^{(W)} n_j^{(W)}} \text{; and}$$

$$J_k^{(W)} = \sum_{C_j \in \mathcal{A}_k^{(W)}} \rho_{k,j}^{(W)} n_j^{(W)}$$

where W is said time window;

j is an index identifying a configuration $C_j$ and k an index identifying a stream;

$$\rho_{k,j}^{(W)}$$

is a configuration-based resource usage ration of a stream index k in a configuration of index j;

$$\mathcal{A}_k^{(W)}$$

is the set of configurations in said time window W in which the stream $S_k$ is active;

$P_{e_k}$ is a channel error probability; and $$n_j^{(W)}$$

is the number of time slots of said time window W in which said configuration $C_j$ occurs.

In one embodiment, the selected cost function being $$J_k^{(W)} = \prod\nolimits_{C_j \in \mathcal{A}_k^{(W)}} P_{e_k}^{\rho_{k,j}^{(W)} n_j^{(W)}},$$

optimizing the cost function using the selected solving method comprises minimizing $$J_k^{(W)}$$

for any stream $S_k$.

In one embodiment, the selected cost function being $$J_k^{(W)} = \sum\nolimits_{C_j \in \mathcal{A}_k^{(W)}} \rho_{k,j}^{(W)} n_j^{(W)},$$

optimizing the cost function using the selected solver algorithm comprises minimizing $$J_k^{(W)}$$

for any stream $S_k$.

In one embodiment, the selected cost function being $$J_k^{(W)} = \sum\nolimits_{C_j \in \mathcal{A}_k^{(W)}} \rho_{k,j}^{(W)} n_j^{(W)},$$

optimizing the cost function using the selected solver algorithm comprises minimizing $$-J_k^{(W)}$$

for any stream $S_k$.

In one embodiment, the solving method is selected in the set of solver method comprising:

a brute-force algorithm wherein all possible values of configuration-based resource usage ratio $$\{\rho_{k,j}^{(W)}\}_{k,j}$$

are tested;

a random algorithm that randomly selects a set of values of configuration-based resource usage ratio $$\{\rho_{k,j}^{(W)}\}_{k,j};$$

a genetic algorithm; and a simplex algorithm.

In one embodiment, the transmitted data are used by the resource scheduler to allocate radio resources between streams.

A processing device in a system comprising a resource scheduler and a set of devices is further disclosed, wherein each device hosts at least one application, each application transmitting a stream of messages to at least one receiver. The processing device comprises at least one processor configured to:

obtain, for each stream, parameters comprising one message lifetime, one message period and a last buffering time of a message of said stream before a given time window starts;

deduce, from the obtained parameters, a set of configurations of said streams in said time window, a configuration of said streams being defined as a specific configuration of active streams, a stream being active in a given time slot in the case where there is a packet corresponding to said message to be sent or received;

compute, for each configuration, one configuration-based resource usage ratio per each stream such that the sum of the configuration-based resource usage ratios for said configuration is equal to one, said computing being under the constraint that, for each stream, there is at least one configuration for which the configuration-based resource usage ratio for said stream is not null;

transmit data to the resource scheduler, said data comprising each configuration with its computed set of configuration-based resource usage ratios.

A system comprising a processing device according to one the previous embodiments and a resource scheduler is disclosed, wherein the resource scheduler allocates radio resources to each stream taking into account the data transmitted by said processing device.

A computer program product comprising program code instructions that can be loaded in a programmable device is disclosed, wherein the program code instructions cause implementation of the method according to any one of the previous embodiments when the program code instructions are run by the programmable device.

A storage medium storing a computer program comprising program code instructions is disclosed, wherein the program code instructions causes implementation of the method according to any one of the previous embodiments when the program code instructions are read from the storage medium and run by a programmable device.

The characteristics of the invention will emerge more clearly from a reading of the following description of at least one example of embodiment, said description being produced with reference to the accompanying drawings.

DESCRIPTION OF EMBODIMENTS

The various embodiments are disclosed in the context of a smart factory where moving robots are installed to fulfill various missions such as for example moving from one location to another location in the factory within a certain amount of time. However, these embodiments may also apply in other environments such as for example environments including autonomous vehicles.

Figure 1:
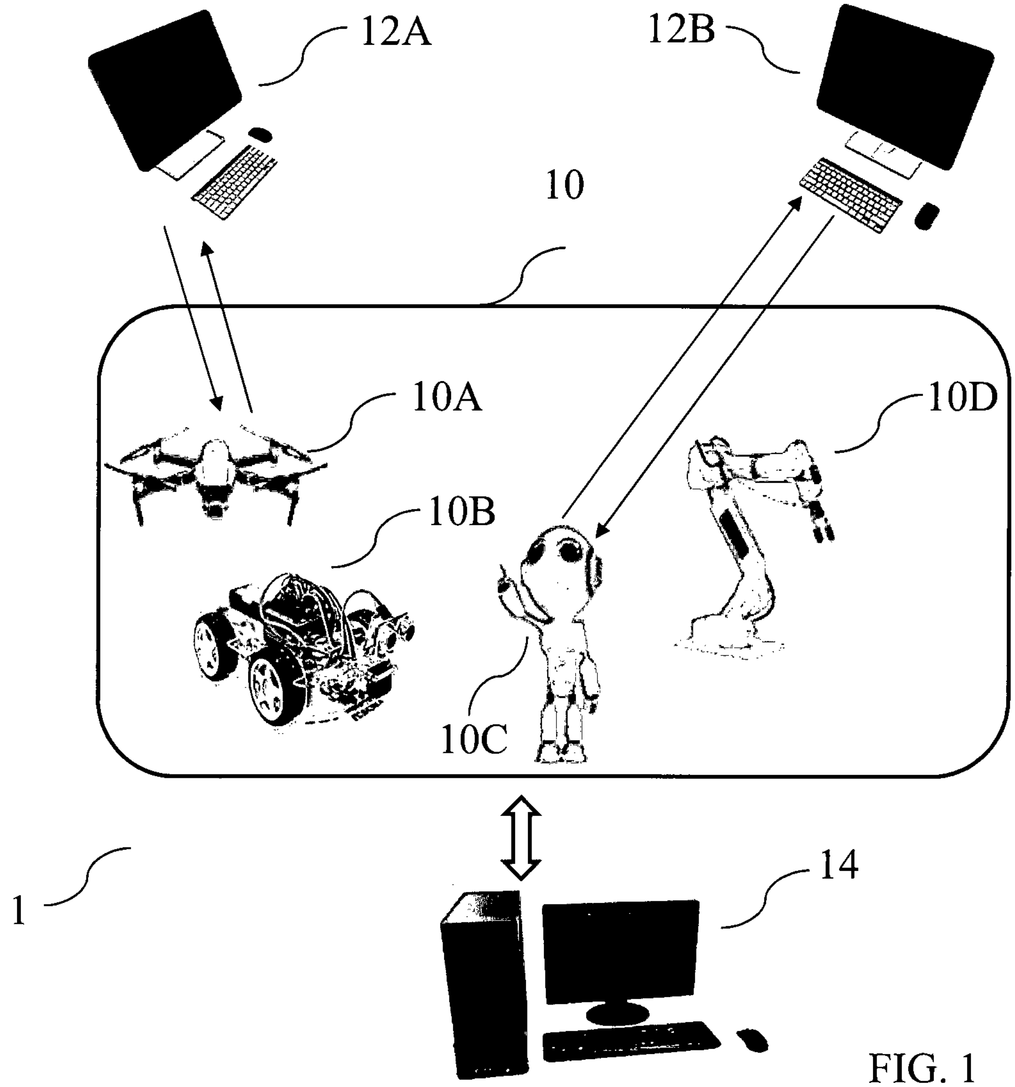
FIG. 1 depicts a system in which the present embodiments may be implemented.

FIG. 1 depicts a system 1, for example as part of a smart factory, in which the present embodiments may be implemented. The system 1 comprises a set 10 of moving robots 10A to 10D, each being capable of moving from one location to another in the factory. The set 10 may also include non-moving robots. The moving robots 10A to 10D are in wireless communication with one or more controlling devices 12A-12B with which they exchange application messages. Each controlling device 12A-12B may be a base station, a MEC (English acronym of "Multi-access Edge Computing") station or a mobile station. The controlling devices 12A-12B are for example configured to plan and monitor the missions of the robots 10A-10D. As an example, on FIG. 1, the controlling device 12A transmits application messages comprising data representative of its mission to the robot 10A while the controlling device 12B transmits application messages comprising data representative of its mission to the robot 10C. The mission data may comprise displacement data (e.g. angular speed, linear speed, pressure level, etc), interaction data, motion data, etc. In return, the robot 10A (10C respectively) transmits application messages to the controlling device 12A (12B respectively). The application messages transmitted from the robots to the controlling devices comprise for example monitoring data or environment data. Depending on the applications, the exchanges of application messages may be periodic or aperiodic.

Each robot 10A-10D and each controlling device 12A-12B comprises at least one application module. Thus, an application message is more particularly exchanged between the application module of a robot and the application module of a controlling device. An application module generally comprises a software entity, namely the application, along with hardware elements such as an application buffer.

A robot usually comprises several physical elements, e.g. a wheel, an arm, etc. Thus, a given robot may need to exchange application messages comprising different types of data with a controlling device depending on the concerned physical element. Therefore, in the following, a stream $S_k$ is defined as the set of application messages $$m_k^{(n)}$$

transmitted from (respectively received by) a given physical element of a given robot in the set 10 of robots. Said otherwise a plurality of streams may be associated with one and the same robot, e.g. one stream associated with the arm of the robot and one stream associated with each wheel of the robot. In the following, Ns streams $\{S_1, \ldots, S_{Ns}\}$ are considered wherein each stream $S_k$ is associated with a given application $APP_k$. There is thus a one-to-one association between an application $APP_k$ and a stream $S_k$. The application $APP_k$ pushes messages $$m_k^{(n)}$$

one-by-one into an application buffer of size one message, the messages $$m_k^{(n)}$$

being transmitted at a time instant n using a radio resource to a corresponding receiver, e.g. to a controlling device.

In a wireless environment, the number of radio resources is limited. In the context of radio communication, the number of resources is defined as the number of frequency resources (e.g. subchannels where each subchannel comprises a finite number of frequency blocks) used in a limited amount of time. Other transmission dimensions can be used to create additional transmission resources such as the spatial dimension provided by multiple antennas, the polarization dimension provided by the usage of different polarizations at the transmitter and receiver, or the multiple-access dimension that allows several transmitter/receiver pairs to have a concurrent transmission as soon as they do not interfere with each other significantly. The set of all radio resources available for transmission by all the transmitter/receiver pairs is called the usable resource set.

Figure 2:
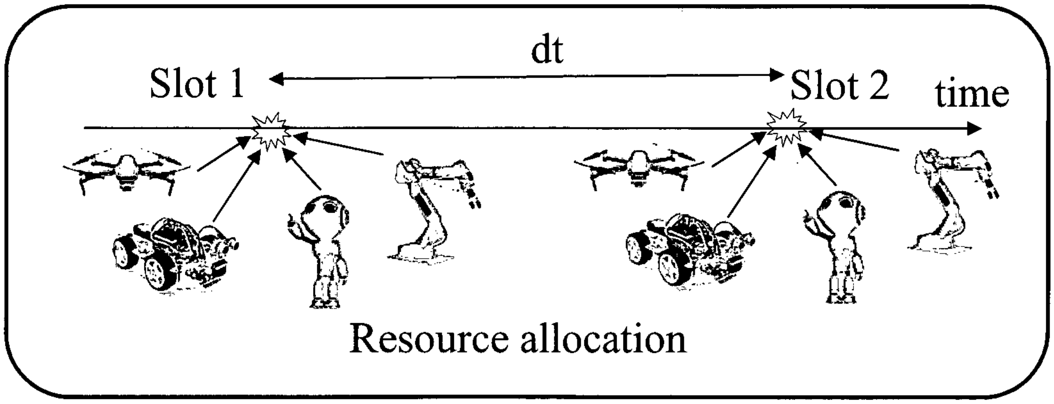
FIG. 2 illustrates the principle of competition between devices to get a radio resource allocation.

In order to appropriately allocate these limited radio resources, the system 1 further comprises a resource scheduler (RS) 14 configured to periodically, i.e. every dt (e.g. dt=1 ms), allocate an available radio resource to one specific stream $S_k$. As depicted on FIG. 2, every dt there is thus an opportunity, i.e. a time slot, for an application message $$m_k^{(n)}$$

to be sent. As illustrated on FIG. 2, the robots and more precisely the streams are in competition to get the radio resource allocation. The resource scheduler 14 is thus configured to select one stream among the Ns streams to allocate the radio resource to.

The resource scheduler 14 usually comprises a software entity along with hardware elements such as a buffer. The resource scheduler 14 may be located in a base station, a MEC station or a mobile station.

Figure 3:
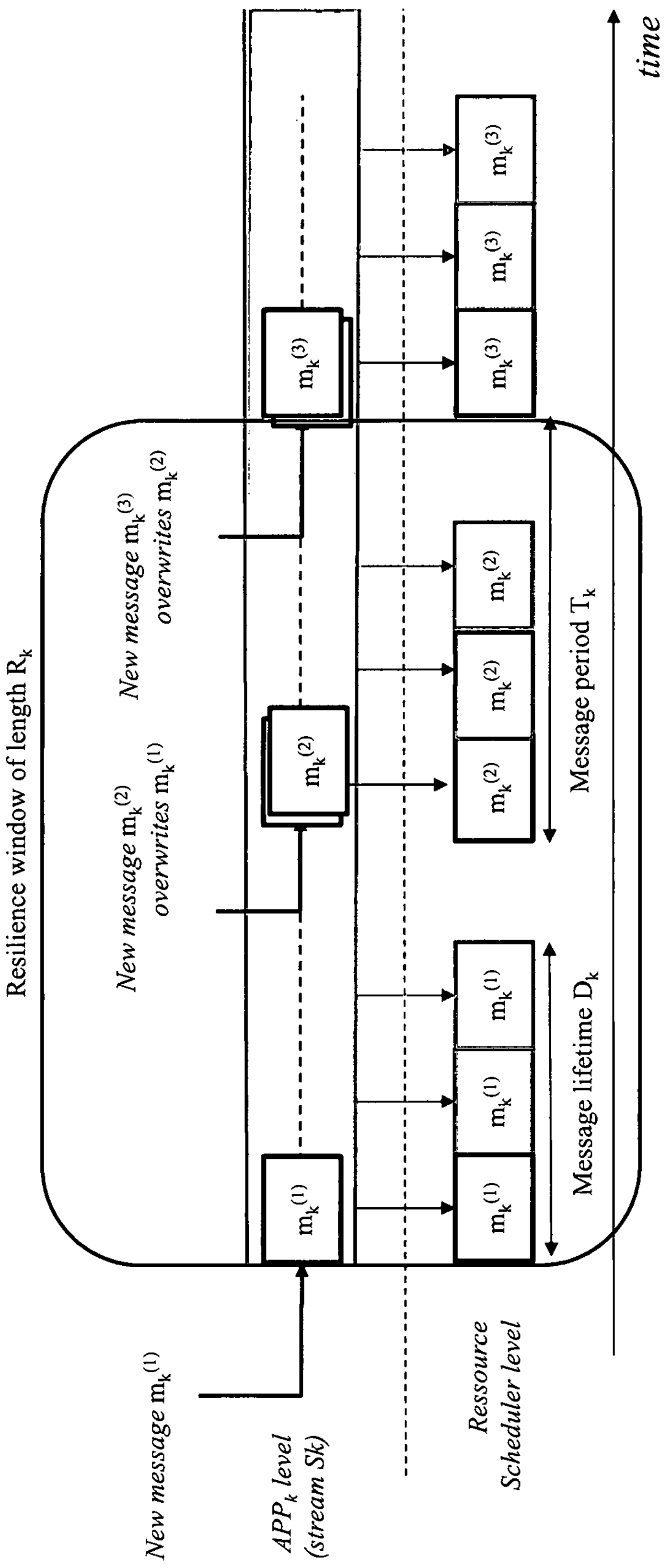
FIG. 3 illustrates various application parameters that relate to a given application.

FIG. 3 illustrates various application parameters that relate to a given application $APP_k$. The application $APP_k$ is for example an application, located in one of the controlling device, configured to control the motion of an arm of a specific robot, e.g. the robot 10C. The application $APP_k$ may be an application located in a specific robot and configured to monitor the environment of the robot. The application $APP_k$ generates a stream $S_k$ comprising several messages $$m_k^{(n)}$$

at various time instant n with n=1, 2, 3 and 4. These messages are to be sent on a transmission channel $H_k$ between the antenna of a robot, e.g. 10C, associated with the stream $S_k$ and the antenna of a controlling device, e.g. 12B. The transmission channel $H_k$ is characterized by its channel error probability $P_{e_k}$.

Each application $APP_k$ has some requirements defined by a set of application parameters, namely a resilience value $R_k$, a message lifetime $D_k$ and a message period $T_k$. These parameters can vary in time but are assumed to be constant within a time window W that is common to all stream $S_k$.

The resilience value $R_k$ is the maximum amount of time the application $APP_k$ authorizes for not receiving any packet. Said otherwise, at least one packet must be received and decoded during $R_k$. In case the resilience value $R_k$ is violated, i.e. the application APP does not receive any packet during a time period superior to $R_k$, an application failure occurs. In this case, the associated robot may enter in a safety mode, e.g. a partial or complete stop with a reinitialization. The resilience value $R_k$ thus defines a resilience window as depicted on FIG. 3 inside which at least one packet must be received and thus decoded.

The message lifetime $D_k$ is the lifetime of a message $$m_k^{(n)}$$

when pushed into the application buffer (also called message delay budget in the literature). Indeed, the message $$m_k^{(n)}$$

of, for example, any monitoring application is only relevant for a limited time duration in particular because of robot motion. On FIG. 3, the lifetime of the first message $$m_k^{(1)},$$

of the second message $$m_k^{(2)}$$

and of the third message $$m_k^{(3)}$$

is 3 time slots.

The message period $T_k$ is the time between the life's start of any two consecutive messages. Said otherwise $T_k$ is the time between the buffering time of two consecutive messages. This period may be variable if the application does not need a periodic traffic.

{Definition of Stream Configuration}

A data stream or more simply a stream $S_k$ is said to be "active" at the time associated with a given resource if there is a packet to be sent or received at this time. Accordingly, the $j^{th}$ stream configuration $C_j$ is defined as a specific combination of streams, e.g. $C_j$ corresponds to $S_1$ being active, $S_2$ being inactive and $S_3$ being active, j being an integer in the set [0; $N_c-1$]. The active index of the stream $S_k$ in a configuration $C_j$ is defined as:

$$\delta_{k,j} \triangleq \begin{cases} 1 & \text{if } S_k \text{ active in } C_j \\ 0 & \text{else} \end{cases}.$$

Figure 4:
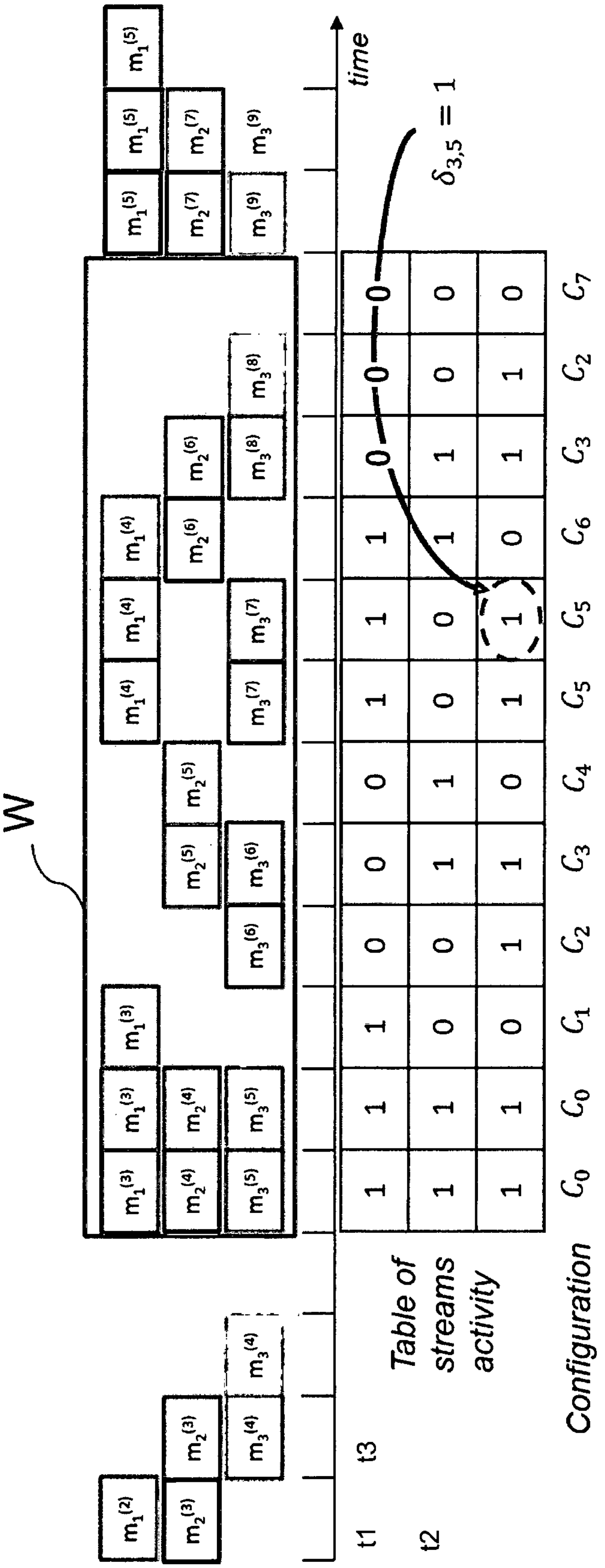
FIG. 4 represents three streams with their buffered messages according to a specific embodiment.

FIG. 4 represents three streams with their buffered messages. Below the streams on FIG. 4, a table of stream activity is represented wherein for each time slot in the common window W, a configuration is derived from the active indices of the streams. There are 8 different configurations. In the first time slot of the window W, all three streams are active therefore it corresponds to a configuration $C_0$ with $S_{1,0}=\delta_{2,0}=\delta_{3,0}=1$. The same occurs in the second time slot. The configuration $C_1$ occurs only once in the third time slot, the configuration $C_2$ occurs twice in the fourth and in the $11^{th}$ time slots, the configuration $C_3$ occurs twice in the $5^{th}$ and $10^{th}$ time slots, the configuration $C_4$ occurs once in the $6^{th}$ time slot, the configuration $C_5$ occurs twice in the $7^{th}$ and $8^{th}$ time slots, the configuration $C_6$ occurs once in the $9^{th}$ time slot and the configuration $C_7$ occurs once in the last time slot.

The diversity of the stream's activity and the number of streams configuration $N_c$, upper bounded by $2^{N_s}$, are determined by the length of the common window W and the values of the parameters $T_k$, $D_k$. For example, in the case where all the traffics are periodic, then length of W may be the least common multipliers of all the periods $T_k$. However, in order to limit complexity, the length of the common window W may be shorter than the least common multipliers of all the periods $T_k$. In fact, the window W has to be long enough to fairly characterize the behavior of all the streams with a reasonable complexity.

{Definition of Configuration-Based Resource Usage Ratios}

Within the window W, the $j^{th}$ configuration $C_j$ occurs in $$n_j^{(W)}$$

time slots. For example, in FIG. 4, $C_5$ occurs in 2 time slots, thus $$n_5^{(W)} = 2, C_6$$

occurs in 1 time slot, thus $$n_6^{(W)} = 1.$$

A configuration-based resource usage ratio $$\rho_{k,j}^{(W)}$$

is defined as the portion of the duration $$n_j^{(W)}$$

of $C_j$ that is allocated to the stream $S_k$ in W. Said otherwise, the configuration-based resource usage ratios are representative of the number of resources allocated to each stream within the window W. This portion is thus defined as:

$$\rho_{k,j}^{(W)} = \frac{n_{k,j}^{(W)}}{n_j^{(W)}}$$

where $$n_{k,j}^{(W)}$$

is a number of time slots allocated to the stream $S_k$, $$n_{k,j}^{(W)}$$

being upper-bounded by $$n_j^{(W)} \cdot \rho_{k,j}^{(W)}$$

should comply with the normalization condition for each configuration $C_j$, i.e.

$$\sum_k \rho_{k,j}^{(W)} = 1,$$

which means that the configuration $C_j$ is fully allocated. For a stream $S_k$ that is inactive in a configuration $C_j$, i.e. $\delta_{k,j}=0$, then $$\rho_{k,j}^{(W)}$$

is set to 0 ("null-null" condition).

In practice, the values of $$\rho_{k,j}^{(W)}$$

are constrained to be in the set $$\left\{\frac{0}{n_j^{(W)}}, \frac{1}{n_j^{(W)}}, \frac{2}{n_j^{(W)}}, \ldots, \frac{n_j^{(W)}}{n_j^{(W)}}\right\}$$

as elementary resource elements are considered for the resource allocations. However, in one embodiment, $$\rho_{k,j}^{(W)}$$

can be any real number between 0 and 1 and a rounding operation to one of the values $$\left\{\frac{0}{n_j^{(W)}}, \frac{1}{n_j^{(W)}}, \frac{2}{n_j^{(W)}}, \ldots, \frac{n_j^{(W)}}{n_j^{(W)}}\right\}$$

is performed afterward, e.g. just before transmitting the value to the resource scheduler.

Several sets of values $$\{\rho_{k,j}^{(W)}\}_{\delta_{k,j}=1}$$

usually satisfy the normalization condition. For example, with reference to FIG. 4, considering the configuration $C_5$ that lasts for $$n_5^{(W)} = 2$$

time slots, the following configuration-based resource usage ratios fulfill the normalization condition:

- $\rho_{1,5}^{(W)} = \rho_{3,5}^{(W)} = 50\%$,
- $\rho_{1,5}^{(W)} = 100\%$, $\rho_{3,5}^{(W)} = 0\%$,
- $\rho_{1,5}^{(W)} = 0\%$, $\rho_{3,5}^{(W)} = 100\%$.

In the configuration $C_5$, the second stream is inactive, thus $$\rho_{2,5}^{(W)} = 0$$

because of the "null-null" condition.

In the following, $$\mathcal{A}_k^{(W)} \triangleq \{C_j \in \{0, 1\}^{N_s} | \delta_{k,j} = 1\}$$

is defined as the set of configurations in W in which $S_k$ is active. A necessary condition on the resource use is that there is at least one configuration $$C_j \in \mathcal{A}_k^{(W)}$$

such that $$\rho_{k,j}^{(W)} \neq 0.$$

In other words, any data stream in W should be allocated.

At least one set of configuration-based resource usage ratios has thus to be computed such that the normalization condition is fulfilled with the constraint that each data stream is allocated in at least one configuration, said at least one set being transmitted to the resource scheduler for guidance.

Figure 5A:
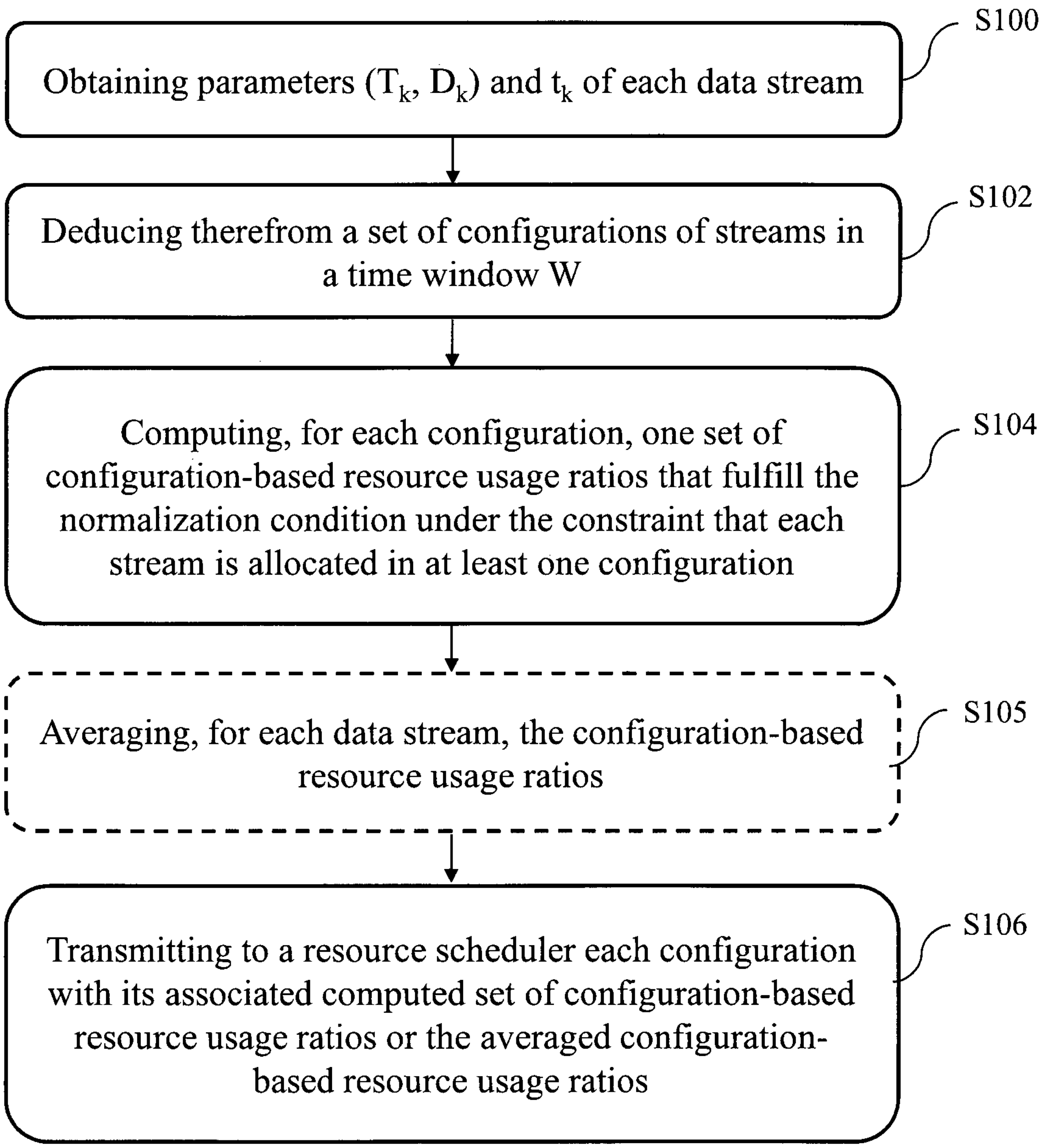
FIG. 5A illustrates a flowchart of a method for computing and transmitting configuration-based resource usage ratios according to a specific embodiment.

FIG. 5A illustrates a flowchart of a method for computing and transmitting configuration-based resource usage ratios according to a specific embodiment.

For each stream $S_k$, application parameters representative of the application's requirements are obtained at step S100. At least $D_k$, $T_k$ and $t_k$ are obtained, where $t_k$ is a last buffering time of a message of stream $S_k$ before the common window W starts. On FIG. 4, t1=t2 and t3 is one time slot after t1. The knowledge of $t_k$ makes it possible to position the streams relative to each other.

At step S102, a finite number N, of stream's configurations $C_j$ in the common time window W are deduced from the application parameters $D_k$ and $T_k$ and further from the time instant $t_k$. The streams configurations in the common window are listed before the common window starts.

At a step S104, one set of configuration-based resource usage ratios $$\{\rho_{k,j}^{(W)}\}_k$$

is computed for each configuration $C_j$ such as to fulfill the normalization condition and under the constraint that each stream is allocated in at least one configuration, i.e. such that there is, for each stream k, at least one configuration $C_j$ such that $$\rho_{k,j}^{(W)}$$

is not null. For a given configuration $C_j$, the set thus comprises a configuration-based resource usage ratio $$\rho_{k,j}^{(W)}$$

per stream $S_k$.

Several such sets exist. In one simple embodiment, as soon as a set $$\{\rho_{k,j}^{(W)}\}_{k,j}$$

is found that satisfy the normalization condition with the further constraint that there is at least one configuration $$C_j \in \mathcal{A}_k^{(W)}$$

such that $$\rho_{k,j}^{(W)} \neq 0,$$

the method continue to step S106.

At step S106, each configuration or an identifier of the configuration and its associated set of configuration-based resource usage ratios, i.e.

$$\{\{\rho_{k,j}^{(W)}\}_k, C_j\}_j,$$

are transmitted to a resource scheduler that uses the transmitted information to guide the radio resource allocation. They are for example transmitted in the form of a table associating with each configuration $C_j$ values $$\{\rho_{k,j}^{(W)}\}_k,$$

thus one value $$\rho_{k,j}^{(W)}$$

per stream $S_k$.

An example of such a table obtained with 3 streams and 8 configurations as depicted on FIG. 4 is presented below:

| Configurations | Configuration-based resource usage ratios |
|---|---|
| $C_0$ | $\rho_{1,0} = 0$ |
| | $\rho_{2,0} = \rho_{3,0} = 0.5$ |
| $C_1$ | $\rho_{1,1} = 1$ |
| $C_2$ | $\rho_{3,2} = 1$ |
| $C_3$ | $\rho_{2,3} = \rho_{3,3} = 0.5$ |
| $C_4$ | $\rho_{2,4} = 1$ |
| $C_5$ | $\rho_{1,5} = 1$ |
| | $\rho_{3,5} = 0$ |
| $C_6$ | $\rho_{1,6} = 0$ |
| | $\rho_{2,6} = 1$ |

These sets of configuration-based resource usage ratios fulfill the normalization condition, the "null-null" condition and for each stream k, there is at least one configuration $C_j$ such that $$\rho_{k,j}^{(W)}$$

is not null. The data for the eighth configuration, i.e.

$$\{\{\rho_{k,7}^{(W)}\}_k, C_7\}_7$$

are also transmitted. In this case, $$\rho_{k,7}^{(W)} = 0$$

for all k. In a variant, the data for the eighth configuration, i.e.

$$\{\{\rho_{k,7}^{(W)}\}_k, C_7\}_7$$

are not transmitted since in this configuration all configuration-based resource usage ratios are null.

The use of the computed configuration-based resource usage ratios $$\{\rho_{k,j}^{(W)}\}_{k,j}$$

transmitted at step S106 depends on the algorithm embedded within the resource scheduler.

In one embodiment, the computed configuration-based resource usage ratios with the configurations $$\{\{\rho_{k,j}^{(W)}\}_k, C_j\}_j$$

are directly transmitted to the resource scheduler at S106. In another embodiment, the configuration-based resource usage ratios $$\{\rho_{k,j}^{(W)}\}_{k,j}$$

are first averaged in an optional step S105 as follows:

$$\rho_k^{(W)} = \frac{\sum_{C_j \in \mathcal{A}_k^{(W)}} \rho_{k,j}^{(W)} n_j^{(W)}}{\sum_{C_j \in \mathcal{A}_k^{(W)}} n_j^{(W)}}.$$

The average computed configuration-based resource usage ratios $$\{\rho_k^{(W)}\}_k$$

are then transmitted to the resource scheduler instead of the data $$\{\{\rho_{k,j}^{(W)}\}_k, C_j\}_j.$$

In this latter embodiment, the configurations are not transmitted to the resource scheduler.

The common window W could adapt in time. In one embodiment, the common window is shifted. At a given time, all configuration-based resource usage ratios $$\{\rho_{k,j}^{(W)}\}_{k,j}$$

are computed in advance and applied within the common window W. Once the end of the common window W is reached, a new common window W starts, and a new set of configuration-based resource usage ratios $$\{\rho_{k,j}^{(W)}\}_{k,j}$$

is computed.

In another embodiment, the common window is a sliding window which makes it possible to increase the robustness. At a given time, all configuration-based resource usage ratios $$\{\rho_{k,j}^{(W)}\}_{k,j}$$

are computed in advance and applied within the common window W. Before the end of the common window W, a new common window W starts, and a new set of configuration-based resource usage ratios $$\{\rho_{k,j}^{(W)}\}_{k,j}$$

is computed.

Figure 5B:
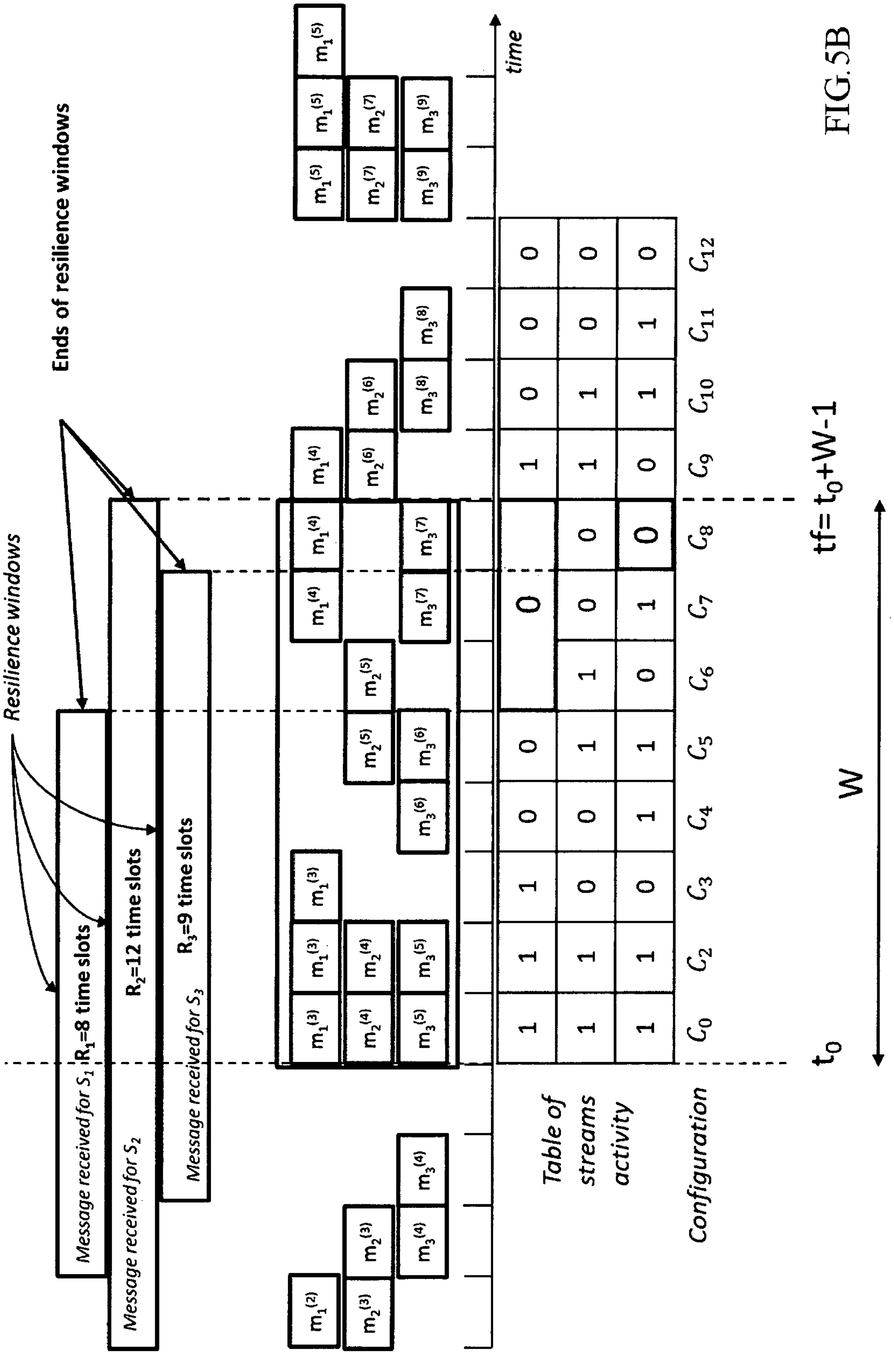
FIG. 5B illustrates the definition of a common time window from resilience values associated with various streams according to a specific embodiment.

In another embodiment disclosed with reference to FIG. 5B, $t_0$ being a time to which a calculation of configuration-based resource usage ratios is expected, the size of the common window W is defined from the resilience values associated with each streams $S_k$. The common window W starts at $t_0$ and ends at tf, wherein tf is defined from the next ends of the resilience windows. More precisely, tf is the most far away next end of the resilience windows. The end of a resilience window corresponds to a resilience violation time. On FIG. 5B, the most far away next end of the resilience windows is the one of stream $S_2$. For any stream whose resilience window ends earlier, i.e. for $S_1$ and $S_3$ on FIG. 5B, its activity is nullified from the end zk of its own resilience window up to tf. Said otherwise, the stream $S_k$ is set inactive in the interval [zk;tf].

In another embodiment, the configuration-based resource usage ratios $$\{\rho_{k,j}^{(W)}\}_{k,j}$$

can be calculated each time an event occurs, e.g. each time the parameters, e.g. R, T and D, are modified.

Figure 6:
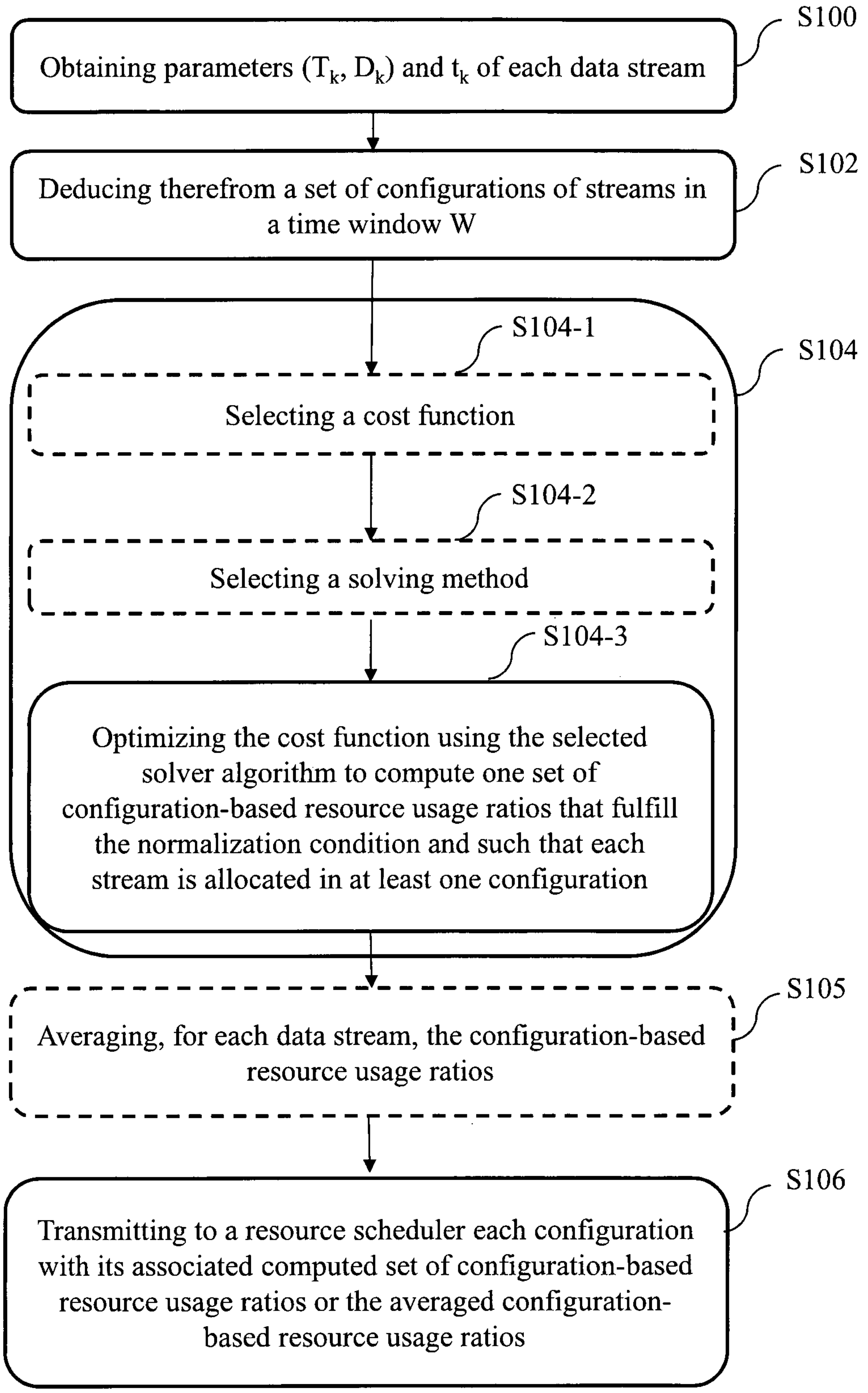
FIG. 6 illustrates a flowchart of a method computing and transmitting configuration-based resource usage ratios according to another embodiment.
Figure 7:
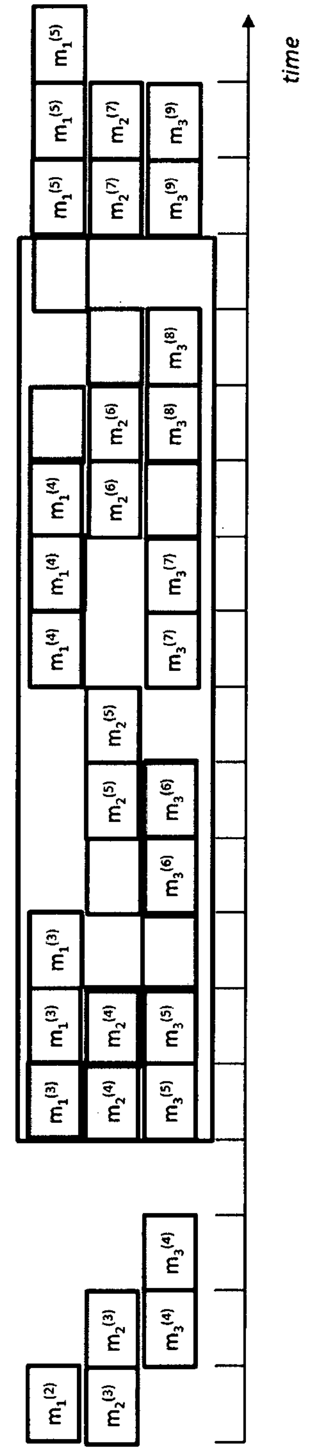
FIG. 7 illustrates the principles of radio resource allocation by a random scheduler without any guidance.
Figure 8:
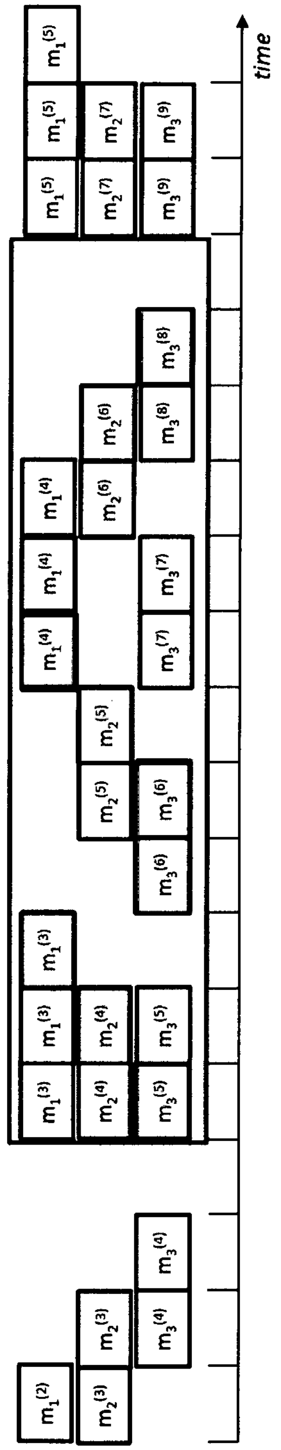
FIG. 8 illustrates the principles of radio resource allocation by a random scheduler guided by configuration-based resource usage ratios according to a first example.
Figure 9:
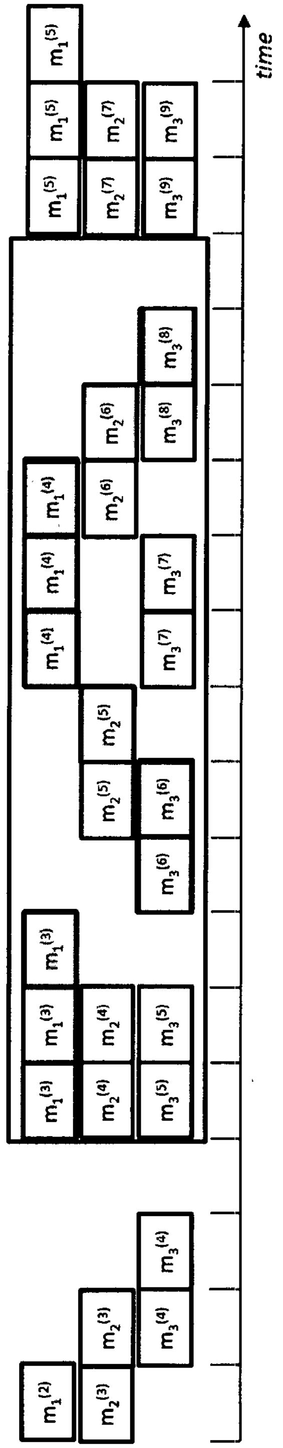
FIG. 9 illustrates the principles of radio resource allocation by a random scheduler guided by configuration-based resource usage ratios according to a second example.
Figure 10:
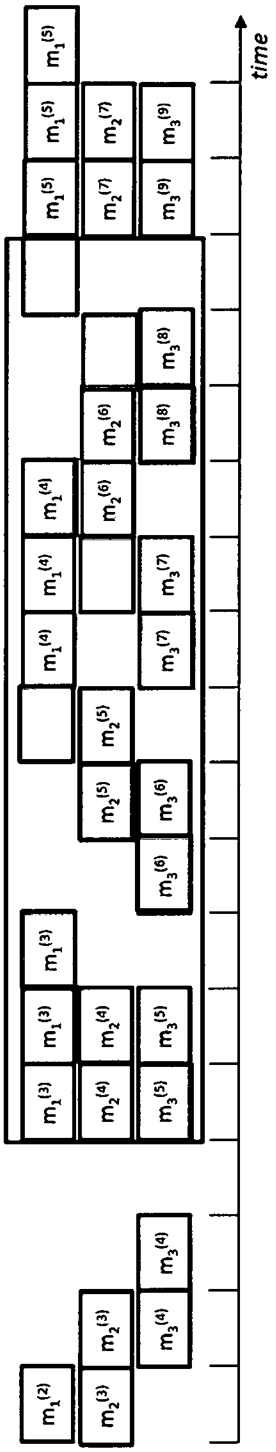
FIG. 10 illustrates the principles of radio resource allocation by a round Robin scheduler without any guidance.

FIG. 6 illustrates a flowchart of a method for computing and transmitting configuration-based resource usage ratios according to a specific embodiment.

The steps identical to the steps of the method illustrated by FIG. 5A are identified on FIG. 6 with the same numeral references. In particular, the method of FIG. 6 comprises the steps S100 to S106 and optionally the step S105.

In the step S104, the configuration-based resource usage ratios $$\{\rho_{k,j}^{(W)}\}_{k,j}$$

are computed by optimizing a cost function.

In a step S104-1, a cost function $$J_k^{(W)}$$

defined as a function of the configuration-based resource usage ratios denoted $$\{\rho_{k,j}^{(W)}\}_{k,j}$$

is selected so that it reflects a target metric of the streams. Said otherwise, depending on the target metric, the cost function $$J_k^{(W)}$$

is defined differently. The target metric may be a) reliability (i.e. minimizing the probability of failure of each stream, b) power saving (i.e. minimizing the power consumption of the devices), or c) throughput (i.e. maximizing the quantity of transmitted data for each stream).

a) Reliability

To enhance the reliability, the purpose is to minimize the probability of failure. Given that $$\rho_{k,j}^{(W)} n_j^{(W)}$$

is the time usage of the configuration $C_j$ by $S_k$, the quantity $$P_{e_k}^{\rho_{k,j}^{(W)} n_j^{(W)}}$$

is thus an expectation of the probability of failure of the stream $S_k$ in $C_j$, where $P_{e_k}$ is the channel error probability for the stream $S_k$. Consequently, an expectation of the probability of failure of the stream $S_k$ in W is the combination of the probabilities of failure in all the active configurations and is thus defined as follows $$J_k^{(W)} = \prod_{C_j \in \mathcal{A}_k^{(W)}} P_{e_k}^{\rho_{k,j}^{(W)} n_j^{(W)}}$$

b) Power Saving

To reduce the power consumption of a device whose stream is $S_k$, the purpose is to minimize the number of transmission attempts. This means that the stream should have the least access to the resource. Consequently, the cost function is defined as the average resource usage ratio itself:

$$J_k^{(W)} = \sum_{C_j \in \mathcal{A}_k^{(W)}} \rho_{k,j}^{(W)} n_j^{(W)}$$

c) Throughput

To maximize the throughput of any stream $S_k$, the purpose is to maximize the number of transmission attempts. This means that the stream should have the greatest access to the resource. Consequently, the cost function is defined as the average resource usage ratio itself:

$$J_k^{(W)} = \sum_{C_j \in \mathcal{A}_k^{(W)}} \rho_{k,j}^{(W)} n_j^{(W)}$$

Accordingly, in order to compute the best set of configuration-based resource usage ratios $$\{\rho_{k,j}^{(W)}\}_{k,j},$$

the intention is to minimize or maximize $$J_k^{(W)}$$

for any stream $S_k$, that is to say to solve the following optimization problem:

$$\{\rho_{k,j}^{(W)}\}_k^* = \min_{\{\rho_{k,j}^{(W)}\}_k} \max_k J_k^{(W)}$$

in the case a) and b) or $$\{\rho_{k,j}^{(W)}\}_k^* = \min_{\{\rho_{k,j}^{(W)}\}_k} \max_k - J_k^{(W)}$$

in the case c).

In a step S104-2, a solving method (e.g. brute-force, random selection, genetic algorithm, linear programming, etc.) is selected to solve the above optimization problem so as to compute the best set of configuration-based resource usage ratios $$\{\rho_{k,j}^{(W)}\}_{k,j}^*$$

that is to be transmitted to the resource scheduler at step S106 for guidance.

In a step S104-3, the selected method is applied to solve the optimization problem derived from the selected cost function, i.e. to determine $$\{\rho_{k,j}^{(W)}\}_{k,j}^* = \min_{\{\rho_{k,j}^{(W)}\}_k} \max_k J_k^{(W)}$$

in the case a) and b) or $$\{\rho_{k,j}^{(W)}\}_k^* = \min_{\{\rho_{k,j}^{(W)}\}_k} \max_k - J_k^{(W)}$$

in the case c).

The following methods may be selected and consequently used to solve the above optimization problem.

1) Brute-Force Method

This basic method to solve the problem comprises testing all the possible values of $$\rho_{k,j}^{(W)} \in \left\{ \frac{0}{n_j^{(W)}}, \frac{1}{n_j^{(W)}}, \frac{2}{n_j^{(W)}}, \ldots, \frac{n_j^{(W)}}{n_j^{(W)}} \right\}$$

for all the streams. Alternatively, the method comprises scanning an arbitrary set of values $$\rho_{k,j}^{(W)}$$

within any arbitrary interval belonging to [0; 1]. This arbitrary set of values may be linked to an hardware capacity or any other hardware or software constraint such as a complexity. An example of such an arbitrary set of values is {1/Ns, 2/Ns, . . . , 1}. For each set $$\{\rho_{k,j}^{(W)}\}_{k,j},$$

it is tested whether the ratios satisfy the normalization condition with the further constraint that there is at least one configuration $$C_j \in \mathcal{A}_k^{(W)}$$

such that $$\rho_{k,j}^{(W)} \neq 0.$$

Among the sets $$\{\rho_{k,j}^{(W)}\}_{k,j}$$

that satisfy the conditions, the set that better optimizes the cost function is selected for transmission at S106, i.e. the one for which $$\max_k J_k^{(W)} \Big( \max_k - J_k^{(W)}$$

respectively) is the smallest. As an example, in the case where $$\max_k J_k^{(W)} \Big( \max_k - J_k^{(W)}$$

respectively) for a first set of ratios is greater than $$\max_k J_k^{(W)} \Big( \max_k - J_k^{(W)}$$

respectively) for a second set $$\{\rho_{k,j}^{(W)}\}_{k,j},$$

then the second set is selected because it better optimizes the cost function.

In the case where several sets $$\{\rho_{k,j}^{(W)}\}_{k,j}$$

satisfy the conditions then the final set is randomly selected.

2) Random Selection

This method comprises randomly selecting one set $$\{\rho_{k,j}^{(W)}\}_{k,j}$$

among all the sets that satisfy the normalization condition.

Alternatively, this method comprises randomly selecting several sets $$\{\rho_{k,j}^{(W)}\}_{k,j}$$

among all the sets that satisfy the normalization condition with the further constraint that that there is at least one configuration $$C_j \in \mathcal{A}_k^{(W)}$$

such that $$\rho_{k,j}^{(W)} \neq 0,$$

computing the cost function for each set and selecting the best set, i.e. the one for which $$\max_k J_k^{(W)} \left( \max_k - J_k^{(W)} \right.$$

respectively) is the smallest.

3) Genetic Algorithm

The method starts with a random configuration of the $$\rho_{k,j}^{(W)}$$

values. Then, the configuration of the $$\rho_{k,j}^{(W)}$$

values is iteratively improved by evaluating the impact of minor changes on the cost function. For example, at each iteration, each $$\rho_{k,j}^{(W)}$$

value is incremented or decremented by $$\frac{1}{n_j^{(W)}},$$

and the configuration associated with the best of the $$2^{n_j^{(W)}}$$

computed cost functions is retained for a next iteration in the case where an improvement is observed. In order to avoid falling in local extrema, several instances of this algorithm may be run with different random initializations.

4) Linear Programming

The problem to solve comprises minimizing the maximum of the cost functions $$\left( \min_{\{\rho_{k,j}^{(W)}\}_k} \max_k J_k^{(W)} \text{ or } \min_{\{\rho_{k,j}^{(W)}\}_k} \max_k - J_k^{(W)} \right)$$

which corresponds to a "min-max" problem. Solving the max-min problem is not an easy task. However, mapping this problem to a linear programming problem is beneficial as existing solving algorithms, e.g. the simplex algorithm, can be used. To this aim, the standard form mentioned in the document from Hu entitled "Simplex algorithm" published in SYSEN 6800, Class Roaster, Cornell University, Fall 2020 has to be obtained. The standard form depends on the definition of the selected cost function.

4.a) Linear Programming to Minimize the Probability of Failure

The resource usage ratios $$\{\rho_{k,j}^{(W)}\}_k$$

are computed to minimize the probability of failure of each stream. Accordingly, to find the best set $$\{\rho_{k,j}^{(W)}\}^*_{k,j},\ J_k^{(W)} \triangleq \prod\nolimits_{C_j \in \mathcal{A}_k^{(W)}} P_{e_k}^{\rho_{k,j}^{(W)} n_j^{(W)}}$$

is minimized for any stream $S_k$ which amounts to solve the problem below:

$$\{\rho_{k,j}^{(W)}\}_k = \min_{\{\rho_{k,j}^{(W)}\}_k} \max_k J_k^{(W)}$$

An equivalent way, easier to implement, is to find $$\{\rho_{k,j}^{(W)}\}^*_{k,j}$$

such that the greatest expectation of the probability of failure lowers $P_{e_{target}}$, an arbitrary upper bound, i.e. for any stream $$S_k : J_k^{(W)} \leq P_{e_{target}}.$$

Let's define the log-expectation of the probability of failure:

$$\log J_k^{(W)} = \sum_{C_j \in \mathcal{A}_k^{(W)}} \rho_{k,j}^{(W)} n_j^{(W)} \log P_{e_k}$$

The above inequality $$\left(J_k^{(W)} \leq P_{e_{target}}\right)$$

is conserved in the log-domain such that for any stream $$S_k \text{ there is } \beta_k^{(W)} \geq 0$$

such that:

$$\sum_{C_j \in \mathcal{A}_k^{(W)}} \rho_{k,j}^{(W)} n_j^{(W)} \log P_{e_k} + \beta_k^{(W)} - \log P_{e_{target}} = 0$$

A selection matrix S is defined as follows $$S = \left[\begin{array}{c|ccccccccc} I_{N_s+1} & & & & & & & & & \\ \hline & \delta_{1,1} & & & & & & & & \\ & & \ddots & & & & & & 0 & \\ & & & \delta_{1,N_c} & & & & & & \\ & & & & \delta_{2,1} & & & & & \\ & & & & & \ddots & & & & \\ & & & & & & \delta_{2,N_c} & & & \\ & & & & & & & \ddots & & \\ & & & & & & & & \delta_{N_s,1} & \\ & & 0 & & & & & & \ddots & \\ & & & & & & & & & \delta_{N_s,N_c} \end{array}\right]$$

$$\underline{x}^{(W)} = S\left[-\log P_{e_{target}} \;\; \beta_1^{(W)} \;\; \beta_2^{(W)} \;\; \ldots \;\; \beta_{N_s}^{(W)} \;\; \left[\rho_{1,j}^{(W)} n_j^{(W)}\right]_j \;\; \left[\rho_{2,j}^{(W)} n_j^{(W)}\right]_j \;\; \ldots \;\; \left[\rho_{N_s,j}^{(W)} n_j^{(W)}\right]_j\right]^T$$

of length $1+N_s+N_sN_c$,

By applying the selection matrix S, $$\rho_{k,j}^{(W)}$$

is automatically nullified if $S_{k,j}=0$ ("null-null condition").

$$\underline{c} = S[-1 \;\; 0 \;\; 0 \;\; \ldots \;\; 0]^T \text{ of length } 1 + N_s + N_sN_c,$$

$$\underline{b}^{(W)} = \left[0 \;\; 0 \;\; \ldots \;\; 0 \;\; n_1^{(W)} \;\; n_2^{(W)} \;\; n_{N_c}^{(W)}\right]^T \text{ of length } N_s + N_c,$$

A = S 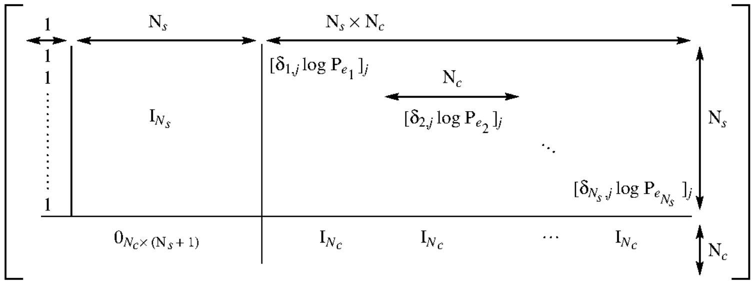

The standard form of a linear programming problem is thus obtained:

$$\min_{\underline{x}^{(W)}} \underline{c}^T \underline{x}^{(W)}$$

$$\text{subject to. } \begin{cases} A\underline{x}^{(W)} = b^{(W)} \\ \underline{x}^{(W)} \geq \underline{0} \end{cases}$$

The linear programming problem is solved by means of the simplex algorithm. By defining the simplex inputs with A, $b^{(W)}$, c, it can be obtained $$\{\rho_{k,j}^{(W)}\}_{k,j}^*$$

the output is $x^{(W)}$ that contains the solution p to the linear programming problem.

4.b) Linear Programming to Minimize the Number of Transmission Attempts

To reduce power consumption, the resource usage ratios $$\{\rho_{k,j}^{(W)}\}_{k,j}$$

are computed to minimize the number of transmission attempts. Accordingly, to find the best set $$\{\rho_{k,j}^{(W)}\}_{k,j}^*, J_k^{(W)} = \sum\nolimits_{C_j \in \mathcal{A}_k^{(W)}} \rho_{k,j}^{(W)} n_j^{(W)}$$

is minimized for any stream $S_k$ which amounts to solve the problem below $$\{\rho_{k,j}^{(W)}\}_k = \min_{\{\rho_{k,j}^{(W)}\}_k} \max_k J_k^{(W)}$$

An equivalent way, easier to implement, is to find $$\{\rho_{k,j}^{(W)}\}_{k,j}^*$$

such that the greatest expectation of the consumptions lowers $\rho_{target}$, an arbitrary upper bound, i.e. for any stream $$S_k : J_k^{(W)} \leq \rho_{target}.$$

To this aim, for each stream $S_k$, the above inequality $$\left(J_k^{(W)} \leq \rho_{target}\right)$$

is equivalent to assume the existence of $$\beta_k^{(W)} \geq 0$$

such that:

$$\sum_{C_j \in \mathcal{A}_k^{(W)}} \rho_{k,j}^{(W)} n_j^{(W)} + \beta_k^{(W)} - \rho_{target} = 0$$

Then a similar implementation as in 4.a) applies.

4.c) Linear Programming to Maximize the Number of Transmission Attempts.

To maximize the throughput, the resource usage ratios $$\{\rho_{k,j}^{(W)}\}_k$$

are computed in order to maximize the number of transmission attempts. Accordingly, to find the best set $$\{\rho_{k,j}^{(W)}\}_{k,j}^* - J_k^{(W)} = \sum\nolimits_{C_j \in \mathcal{A}_k^{(W)}} \rho_{k,j}^{(W)} n_j^{(W)}$$

is minimized for any stream $S_k$ which amounts to solve the problem below:

$$\{\rho_{k,j}^{(W)}\}_k = \min_{\{\rho_{k,j}^{(W)}\}_k} \max_k - J_k^{(W)}.$$

An equivalent way, easier to implement, is to find $$\{\rho_{k,j}^{(W)}\}_{k,j}^*$$

such that the greatest expectation of the consumptions lowers $-U_{target}$, an arbitrary upper bound, i.e. for any stream $$S_k : -J_k^{(W)} \leq -U_{target}.$$

To this aim, for each stream $S_k$, the above inequality $$\left(-J_k^{(W)} \leq -U_{target}\right)$$

is equivalent to assume the existence of $$\beta_k^{(W)} \geq 0$$

such that:

$$-\sum_{C_j \in \mathcal{A}_k^{(W)}} \rho_{k,j}^{(W)} n_j^{(W)} + \beta_k^{(W)} + U_{target} = 0.$$

Then a similar implementation as in 4.a) applies.

The computation of the configuration-based resource usage ratios $$\{\rho_{k,j}^{(W)}\}_{k,j}^{*}$$

by using an optimal algorithm from the latest streams parameters allows the scheduler to get a more relevant prediction of the resource usage, which improves the performance with respect to a prediction based on a learning from the past transmissions.

The method is robust to unexpected events that may concern the radio conditions or the packet arrival, i.e. jitter, and also new application requirements, new streams parameters. Indeed, an application may change its requirements based on the observed communication performance.

FIGS. 7 to 13 illustrate how a resource scheduler is guided by the configuration-based resource usage ratios $$\{\rho_{k,j}^{(W)}\}_{k,j}^{*}$$

in order to allocate radio resources. The resource scheduler belongs to a non-exhaustive list of resource schedulers comprising a) a random scheduler, b) a round robin scheduler and c) a throughput max scheduler. Other schedulers may be used.

a) Random Scheduler

The random scheduler allocates a radio resource at every time slot by randomly selecting a stream $S_k$. Without any guidance, the random scheduler may either give the resource to a stream whose message is dead, or the random scheduler may give too much radio resource to one stream at the expense of other streams. An example is illustrated on FIG. 7. On this Figure, the random scheduler allocates radio resources without any guidance.

Consequently, $S_1$ is allocated on 5 time slots 3 time slots where $S_1$ has a packet to send 2 time slots where $S_1$ has no packet to send $S_2$ is Allocated on 4 Time Slots:

2 time slots where $S_2$ has a packet to send 2 time slots where $S_2$ has no packet to send $S_3$ is Allocated on 3 Time Slots:

1 time slot where $Y_3$ has a packet to send 2 time slots where $S_3$ has no packet to send There is thus a clear waste of radio resource since for example time slots are allocated to streams that have no packet to transmit in the allocated time slot. From the stream's configurations as in FIG. 4, the following description table may be obtained:

| Configuration | Duration | $S_1$ active | $S_2$ active | $S_3$ active | Normalization condition |
|---|---|---|---|---|---|
| $C_0$ | 2 | Yes | Yes | Yes | $\rho_{1,0}+\rho_{2,0}+\rho_{3,0}=1$ |
| $C_1$ | 1 | Yes | | | $\rho_{1,1}=1$ |
| $C_2$ | 2 | | | Yes | $\rho_{3,2}=1$ |
| $C_3$ | 2 | | Yes | Yes | $\rho_{2,3}+\rho_{3,3}=1$ |
| $C_4$ | 1 | | Yes | | $\rho_{2,4}=1$ |
| $C_5$ | 2 | Yes | | Yes | $\rho_{1,5}+\rho_{3,5}=1$ |
| $C_6$ | 1 | Yes | Yes | | $\rho_{1,6}+\rho_{2,6}=1$ |

The table below illustrates on the two left columns an example of configuration-based resource usage ratios that fulfill the normalization condition. The condition that, for each stream k, there is at least one configuration $C_j$ such that $$\rho_{k,j}^{(W)}$$

is not null is also fulfilled. On the four right columns, an example of radio resource allocation by the random scheduler that respects the configuration-based resource usage ratios is provided.

| Configuration | Resource usage ratios | Duration | # time slots for $S_1$ | # time slots for $S_2$ | # time slots for $S_3$ |
|---|---|---|---|---|---|
| $C_0$ | $\rho_{1,0}=0$<br>$\rho_{2,0}=\rho_{3,0}=0.5$ | 2 | 0 | 1 | 1 |
| $C_1$ | $\rho_{1,1}=1$ | 1 | 1 | | |
| $C_2$ | $\rho_{3,2}=1$ | 2 | | | 2 |
| $C_3$ | $\rho_{2,3}=\rho_{3,3}=0.5$ | 2 | | 1 | 1 |
| $C_4$ | $\rho_{2,4}=1$ | 1 | | 1 | |
| $C_5$ | $\rho_{1,5}=1$<br>$\rho_{3,5}=0$ | 2 | 2 | | 0 |
| $C_6$ | $\rho_{1,6}=0$<br>$\rho_{2,6}=1$ | 1 | 0 | 1 | |

A radio resource is thus allocated to each stream when relevant. $S_1$ is allocated on 3 time slots, $S_2$ is allocated on 4 time slots and $S_3$ is allocated on 4 time slots. Finally, for each occurrence of any stream's configuration, the resource scheduler randomly selects the stream that is allocated, e.g. as illustrated on FIG. 8.

In a next example, the configuration-based resource usage ratios target a non-equal sharing of the resource with a high priority on $S_1$. The table below illustrates on the two left columns an example of configuration-based resource usage ratios that fulfill the normalization condition. The condition that, for each stream k, there is at least one configuration $C_j$ such that $$\rho_{k,j}^{(W)}$$

is not null is also fulfilled. On the four right columns, an example of radio resource allocation by the random scheduler that respects the configuration-based resource usage ratios is provided.

| Configuration | Resource usage ratios | Duration | # time slots for $S_1$ | # time slots for $S_2$ | # time slots for $S_3$ |
|---|---|---|---|---|---|
| $C_0$ | $\rho_{1,0} = 1$ $\rho_{2,0} = \rho_{3,0} = 0$ | 2 | 2 | 0 | 0 |
| $C_1$ | $\rho_{1,1} = 1$ | 1 | 1 | | |
| $C_2$ | $\rho_{3,2} = 1$ | 2 | | | 2 |
| $C_3$ | $\rho_{2,3} = \rho_{3,3} = 0.5$ | 2 | | 1 | 1 |
| $C_4$ | $\rho_{2,4} = 1$ | 1 | | 1 | |
| $C_5$ | $\rho_{1,5} = 1$ $\rho_{3,5} = 0$ | 2 | 2 | | 0 |
| $C_6$ | $\rho_{1,6} = 1$ $\rho_{2,6} = 0$ | 1 | 1 | 0 | |

A radio resource is thus allocated to each stream when relevant with high priority given to $S_1$. $S_1$ is allocated on 6 time slots, $S_2$ is allocated on 2 time slots and $S_3$ is allocated on 3 time slots. Finally, for each occurrence of any stream's configuration, the resource scheduler randomly selects the stream that is allocated, e.g. as illustrated on FIG. 9.

b) Round Robin Scheduler

A round Robin scheduler is disclosed in section 7.7 of the document from Arpaci-Dusseau entitled "*Operating Systems: Three Easy Pieces*", Chapter 7, Arpaci-Dusseau Books, 2014. Such a resource scheduler allocates each stream in equal portions and in a circular order without any priority as depicted on FIG. 10. On this Figure, the round Robin scheduler allocates radio resources without any guidance. Basically, the scheduler permanently turns on all the streams to allocate the radio resource, whatever the resource consumption of each stream and whatever their needs. This may conduct to a waste of radio resources.

In an embodiment, the round Robin scheduler counts, round by round, the quantity of radio resource allocated to each stream in the common window W. When the said quantity of radio resource amounts the value for a stream derived from the configuration-based resource usage ratios, the stream is removed from the scheduler in W.

More precisely, given W and the configurations $C_j$, the number of allocation attempts each stream is going to make in W is known. With the guidance, i.e. the configuration-based resource usage ratios, the portion of these numbers of attempts that must be considered is deduced. A stream $S_k$ that has reached its ratio $$\rho_{k,j}^{(W)}$$

for a given configuration $C_j$ is thus not considered by the scheduler for the next allocation attempts for this configuration in the common window W.

In the case where the round Robin scheduler does not have access to the configurations $C_j$, the round-Robin scheduler applies the averaged ratios obtained at optional step S105.

A stream that has reached its average ratio $$\rho_k^{(W)}$$

is thus not considered by the scheduler for the next allocation attempts in the common window W.

Figure 11:
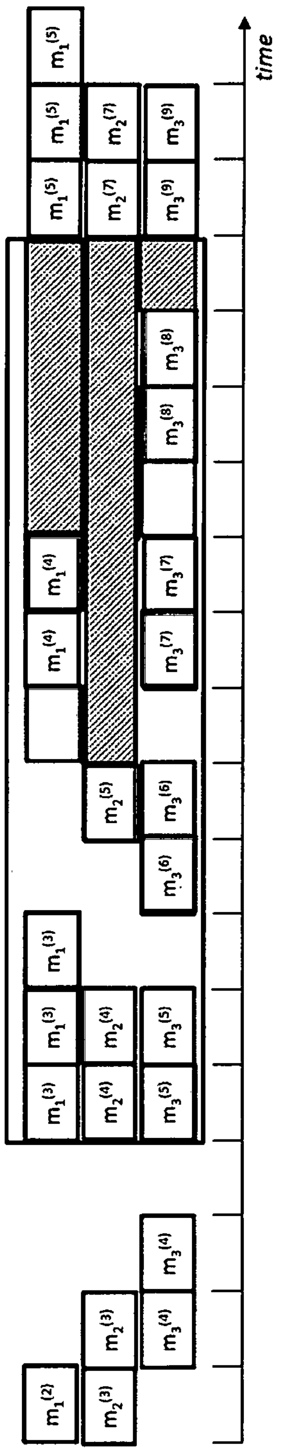
FIG. 11 illustrates the principles of radio resource allocation by a round Robin scheduler guided by configuration-based resource usage ratios according to a particular example.

Considering the following configuration-based resource usage ratios:

$$\rho_1^{(W)} = 50\%,\ \rho_2^{(W)} = 33\%,\ \rho_3^{(W)} = 75\%$$

and given the message lifetime $D_k$ of the streams in W, the numbers of allocated time slots is as follows:

$$n_1^{(W)} = 3,\ n_2^{(W)} = 2,\ n_3^{(W)} = 6,$$

as illustrated on FIG. 11. Indeed, in the case where the configurations $C_j$ are known, $S_1$ has 6 packets or 6 requests for allocation in W. With $$\rho_1^{(W)} = 50\%,$$

of the 6 packets or requests, only 3 time slots are really allocated to $S_1$.

$S_2$ has 6 packets or 6 requests for allocation in W. With $$\rho_2^{(W)} = 33\%,$$

of the 6 packets or requests, only 2 time slots are really allocated to $S_2$.

$S_3$ has 8 packets or 8 requests for allocation in W. With $$\rho_3^{(W)} = 75\%,$$

of the 8 packets or requests, 6 time slots are really allocated to $S_3$.

c) Throughput Max Scheduler

Figure 12:
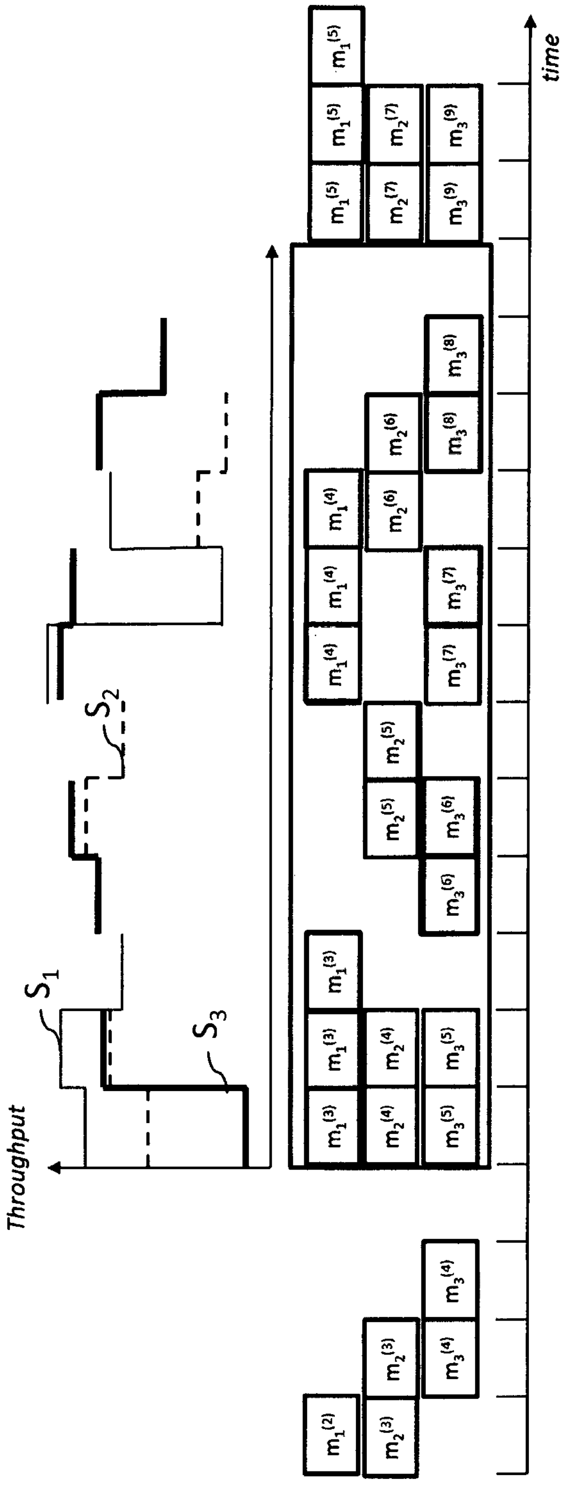
FIG. 12 illustrates the principles of radio resource allocation by a throughput-max scheduler without any guidance.

At each time slot, the throughput max scheduler allocates a radio resource to the stream with the greatest expected throughput as depicted on FIG. 12. On this Figure, the throughput max scheduler allocates radio resources without any guidance. This may conduct to a waste of radio resources.

In an embodiment, the throughput max scheduler counts, round by round, the quantity of radio resource allocated to each stream in the common window W. When the said quantity of radio resource amounts the value for a stream derived from the configuration-based resource usage ratios, the stream is removed from the scheduler in W.

Figure 13:
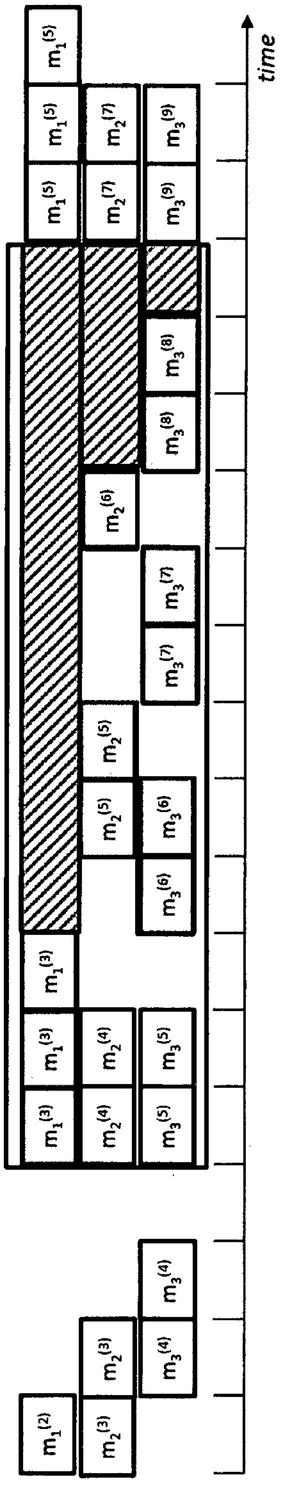
FIG. 13 illustrates the principles of radio resource allocation by a throughput-max scheduler guided by configuration-based resource usage ratios according to a particular example.

Considering the following configuration-based resource usage ratios:

$$\rho_1^{(W)} = 50\%,\ \rho_2^{(W)} = 33\%,\ \rho_3^{(W)} = 75\%$$

and given the message lifetime $D_k$ of the streams in W, the numbers of allocated time slots is as follows:

$$n_1^{(W)} = 3,\ n_2^{(W)} = 2,\ n_3^{(W)} = 6,$$

as illustrated on FIG. 13.

Figure 14:
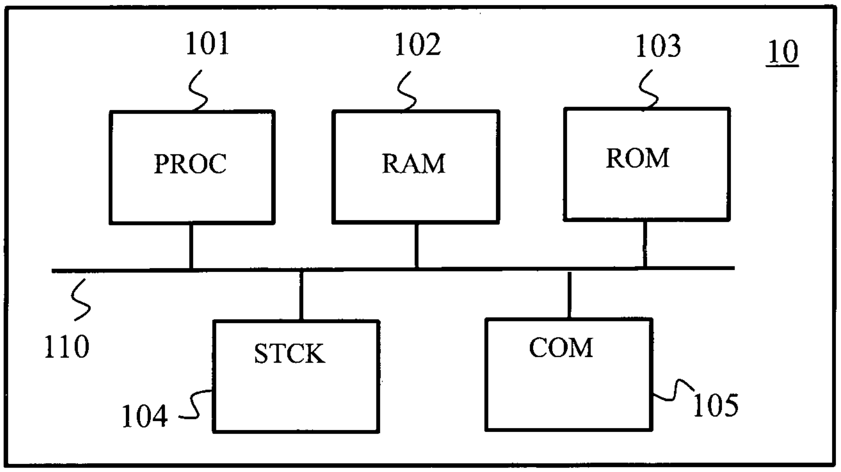
FIG. 14 illustrates schematically an example of hardware architecture of a processing device configured to compute and transmit configuration-based resource usage ratios according to a specific embodiment.

FIG. 14 illustrates schematically an example of hardware architecture of a processing device 10 configured to compute configuration-based resource usage ratios according to a specific embodiment.

The processing device 10 comprises, connected by a communication bus 110: a processor or CPU (acronym of "Central Processing Unit") 101; a random access memory RAM 102; a read only memory ROM 103; a storage unit 104 such as an hard disk or such as a storage medium reader, e.g. a SD (acronym of "Secure Digital") card reader; and at least one set of communication interfaces COM 105 enabling the processing device 10 to transmit and receive data.

The processor 101 is capable of executing instructions loaded into the RAM 102 from the ROM 103, from an external memory (such as an SD card), from a storage medium (such as the HDD), or from a communication network. When the processing device 10 is powered up, the processor 101 is capable of reading instructions from the RAM 102 and executing them. These instructions form a computer program causing the implementation, by the processor 101, of the methods described in relation to FIGS. 5 to 6.

The methods described in relation to FIGS. 5 to 6 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the processing device 10 includes electronic circuitry adapted and configured for implementing the methods described in relation to FIGS. 5 to 6.

The invention claimed is:

1. A method in a system comprising a resource scheduler and a set of devices, each device hosting at least one application, each application transmitting a stream of messages to at least one receiver, characterized in that the method comprises:

obtaining, for each stream, parameters comprising one message lifetime, one message period and a last buffering time of a message of said stream before a given time window starts, the message lifetime being the lifetime of a message when pushed into an application buffer and the message is relevant for a limited time duration and the message period being the time between the buffering time of two consecutive messages;

deducing, from the obtained parameters, a set of configurations of said streams in said time window, a configuration of said streams being defined as a specific configuration of active streams, a stream being active in a given time slot in the case where there is a packet corresponding to said message to be sent or received;

computing, for each configuration, one configuration-based resource usage ratio per each stream such that the sum of the configuration-based resource usage ratios for said configuration is equal to one, said computing being under the constraint that, for each stream, there is at least one configuration for which the configuration-based resource usage ratio for said stream is not null;

transmitting data to the resource scheduler, said data comprising each configuration with its computed set of configuration-based resource usage ratios, allocating, by the resource scheduler, resources between streams.

2. The method of claim 1, wherein the obtained parameters further comprise a resilience value being a maximum amount of time an application authorizes for not receiving any packet and wherein the size of said time window is defined from said resilience values.

3. The method according to claim 1, wherein the method further comprises:

averaging, for each stream, the configuration-based resource usage ratios of said stream;

and wherein transmitting data to the resource scheduler comprises transmitting, for each stream, the averaged configuration-based resource usage ratio instead of transmitting each configuration with its computed set of configuration-based resource usage ratios.

4. The method according to claim 1, wherein computing, for each configuration, one configuration-based resource usage ratio per each stream comprises:

selecting a cost function;

selecting a solving method; and optimizing the cost function using the selected solving method to compute, for each configuration, one configuration-based resource usage ratio per each stream such that the sum of the configuration-based resource usage ratios for said configuration is equal to one, said computing being under the constraint that, for each stream, there is at least one configuration for which the configuration-based resource usage ratio for said stream is not null, wherein said cost function is selected in a set comprising the following cost functions:

$$J_k^{(W)} = \prod_{C_j \in \mathcal{A}_k^{(W)}} P_{e_k}^{\rho_{k,j}^{(W)} n_j^{(W)}}$$; and $$J_k^{(W)} = \sum_{C_j \in \mathcal{A}_k^{(W)}} \rho_{k,j}^{(W)} n_j^{(W)}$$

where W is said time window;

j is an index identifying a configuration $C_j$ and k an index identifying a stream;

$$\rho_{k,j}^{(W)}$$

is a configuration-based resource usage ratio of a stream of index k in a configuration of index j;

$$\mathcal{A}_k^{(W)}$$

is the set of configurations in said time window W in which the stream $S_k$ is active:

$P_{e_k}$ is a channel error probability; and $$n_j^{(W)}$$

is the number of time slots of said time window W in which said configuration $C_j$ occurs.

5. The method according to claim 4, wherein, the selected cost function being $$J_k^{(W)} = \prod\nolimits_{C_j \in \mathcal{A}_k^{(W)}} P_{e_k}^{\rho_{k,j}^{(W)} n_j^{(W)}},$$

optimizing the cost function using the selected solving method comprises minimizing $$J_k^{(W)}$$

for any stream $S_k$.

6. The method according to claim 4, wherein, the selected cost function being $$J_k^{(W)} = \sum\nolimits_{C_j \in \mathcal{A}_k^{(W)}} \rho_{k,j}^{(W)} n_j^{(W)},$$

optimizing the cost function using the selected solver algorithm comprises minimizing $$J_k^{(W)}$$

for any stream $S_k$.

7. The method according to claim 4, wherein, the selected cost function being $$J_k^{(W)} = \sum\nolimits_{C_j \in \mathcal{A}_k^{(W)}} \rho_{k,j}^{(W)} n_j^{(W)},$$

optimizing the cost function using the selected solver algorithm comprises minimizing $$-J_k^{(W)}$$

for any stream $S_k$.

8. The method according to claim 4, wherein the solving method is selected in the set of solver method comprising:

a brute-force algorithm wherein all possible values of configuration-based resource usage ratio $$\{\rho_{k,j}^{(W)}\}_{k,j}$$

are tested;

a random algorithm that randomly selects a set of values of configuration-based resource usage ratio $$\{\rho_{k,j}^{(W)}\}_{k,j};$$

a genetic algorithm; and a simplex algorithm.

9. The method according to claim 1, wherein the transmitted data are used by the resource scheduler to allocate radio resources between streams.

10. A computer program product comprising program code instructions that can be loaded in a programmable device, the program code instructions causing implementation of the method according to claim 1 when the program code instructions are run by the programmable device.

11. A non-transitory storage medium storing a computer program comprising program code instructions, the program code instructions causing implementation of the method according to claim 1 when the program code instructions are read from the storage medium and run by a programmable device.

12. A processing device in a system comprising a resource scheduler and a set of devices, each device hosting at least one application, each application transmitting a stream of messages to at least one receiver, characterized in that the processing device comprises at least one processor configured to:

obtain, for each stream, parameters comprising one message lifetime, one message period and a last buffering time of a message of said stream before a given time window starts, the message lifetime being the lifetime of a message when pushed into an application buffer and the message is relevant for a limited time duration and the message period being the time between the buffering time of two consecutive messages;

deduce, from the obtained parameters, a set of configurations of said streams in said time window, a configuration of said streams being defined as a specific configuration of active streams, a stream being active in a given time slot in the case where there is a packet corresponding to said message to be sent or received;

compute, for each configuration, one configuration-based resource usage ratio per each stream such that the sum of the configuration-based resource usage ratios for said configuration is equal to one, said computing being under the constraint that, for each stream, there is at least one configuration for which the configuration-based resource usage ratio for said stream is not null;

transmit data to the resource scheduler, said data comprising each configuration with its computed set of configuration-based resource usage ratios, allocating by the resource scheduler resources between streams.

13. A system comprising a processing device according to claim 12 and a resource scheduler, wherein the resource scheduler allocates radio resources to each stream taking into account the data transmitted by said processing device.

* * * * *